US006754192B2

United States Patent
Kennedy

(10) Patent No.: US 6,754,192 B2
(45) Date of Patent: Jun. 22, 2004

(54) TEMPORAL TRANSITION NETWORK PROTOCOL (TTNP) IN A MOBILE AD HOC NETWORK

(75) Inventor: Robert A. Kennedy, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 75 days.

(21) Appl. No.: 10/134,856

(22) Filed: Apr. 29, 2002

(65) Prior Publication Data

US 2003/0202512 A1 Oct. 30, 2003

(51) Int. Cl.⁷ .......................................... G06F 15/177
(52) U.S. Cl. ........................................ 370/331; 370/328
(58) Field of Search ................................ 370/328, 329, 370/341, 254–256, 252, 396, 398, 437, 338, 332

(56) References Cited

U.S. PATENT DOCUMENTS

| | | | | |
|---|---|---|---|---|
| 5,412,654 | A | 5/1995 | Perkins | 370/94.1 |
| 5,987,011 | A | 11/1999 | Toh | 370/331 |
| 6,304,556 | B1 | 10/2001 | Haas | 370/254 |
| 6,307,843 | B1 * | 10/2001 | Okanoue | 370/312 |
| 6,385,174 | B1 | 5/2002 | Li | 370/252 |
| 6,456,599 | B1 * | 9/2002 | Elliott | 370/254 |
| 6,601,093 | B1 * | 7/2003 | Peters | 709/220 |
| 2001/0033556 | A1 | 10/2001 | Krishnamurthy et al. | 370/329 |

OTHER PUBLICATIONS

Mirhakkak et al., *Dynamic Quality–of–Service for Mobile Ad Hoc Networks*, MITRE Corp., 2000.
Van Dyck et al., *Distributed Sensor Processing Over an Ad–Hoc Wireless Network: Simulation Framework And Performance Criteria*, Proceedings IEEE Milcom, Oct. 2001.
Zhu, *Medium Access Control and Quality–of–Service for Mobile Ad Hoc Networks*, PHD Thesis, Department of Computer Engineering, University of Maryland, College Park, MD, 2001.
Royer et al., *A Review of Current Routing Protocols for Ad Hoc Mobile Wireless Networks*, IEEE Personal Communications, Apr. 1999, pp. 46–55.
Corson et al., *A Reservation–Based Multicast (RBM) Routing Protocol for Mobile Networks: Initial Route Constructions Phase*, ACM/I. 1, No. 4, 1995, pp. 1–39.
Xiao et al., *A Flexible Quality of Service Model for Mobile Ad Hoc Networks*, IEEE VTC2000–spring, Tokyo, Japan, May 2000.
Wu et al., *QoS Support in Mobile Ad Hoc Networks*, Computing Science Department, University of Alberta, (no date available).

(List continued on next page.)

Primary Examiner—Wellington Chin
Assistant Examiner—Brenda Pham
(74) Attorney, Agent, or Firm—Allen, Dyer, Doppelt, Milbrath & Gilchrist, P.A.

(57) ABSTRACT

The mobile ad hoc network includes a plurality of wireless mobile nodes and a plurality of wireless communication links connecting the nodes together. The method includes building and updating route tables at each node by managing and controlling the application of either proactive or reactive route discovery and their respective associated processes to define and maintain routes in the network. A route is a set of links and nodes from a source to a destination. The method also includes collecting and storing route stability information at each node, predicting route stability over time based upon the route stability information, and switching to the other of the proactive and reactive route discovery and the associated processes when predicted route stability reaches a first transition parameter. Moreover, the method preferably includes switching back to the first one of the proactive and reactive route discovery and the associated processes when predicted route stability reaches a second transition parameter. Thus temporal transitioning of route discovery and associated processes in a mobile ad hoc network is provided.

38 Claims, 3 Drawing Sheets

OTHER PUBLICATIONS

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al. *Optimized Link State Routing Protocol*, Internet Engineering Task Force (IETF) MANET Working Group, Internet Draft, Oct. 31, 2001.

Perkins et al., *Quality of Service in Ad Hoc On–Demand Distance Vector Routing*, Internet Engineering Task Force (IETF) MANET Working Group, Internet Draft, Jul. 2000.

Park et al., *Temporally–Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve–Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Networks*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On–Demand Distance Vector (ADOV) Routing*, Internet Engineering Task Force (IETF) MANET Working Group, Internet Draft, Nov. 9, 2001.

Chakrabarti et al., "QoS Issues in Ad Hoc Wireless Networks", , IEEE Communications Magazine, (2/01), pp. 142–148.

Chen, "Routing Support for Providing Guaranteed End–to–End Quality–of–Service," Ph.D. thesis, Univ. of Illinois at Urbana–Champaign, http://cairo.cs.uiuc.edu/papers/scthesis.ps. 1999.

* cited by examiner

TEMPORAL TRANSITION NETWORK PROTOCOL (TTNP) IN A MOBILE AD HOC NETWORK

FIELD OF THE INVENTION

The present invention relates to the field of communication networks, and, more particularly, to mobile ad hoc wireless networks and related methods.

BACKGROUND OF THE INVENTION

Wireless networks have experienced increased development in the past decade. One of the most rapidly developing areas is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

In a hostile environment where a fixed communication infrastructure is unreliable or unavailable, such as in a battle field or in a natural disaster area struck by earthquake or hurricane, an ad hoc network can be quickly deployed and provide much needed communications. While the military is still a major driving force behind the development of these networks, ad hoc networks are quickly finding new applications in civilian or commercial areas. Ad hoc networks will allow people to exchange data in the field or in a class room without using any network structure except the one they create by simply turning on their computers or PDAs.

As wireless communication increasingly permeates everyday life, new applications for mobile ad hoc networks will continue to emerge and become an important part of the communication structure. Mobile ad hoc networks pose serious challenges to the designers. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route.

SUMMARY OF THE INVENTION

In view of the foregoing background, it is therefore an object of the present invention to provide the management and control of route discovery and associated processes via temporal transitioning processes and events in a mobile ad hoc network. For the present invention, it is to be understood that when a route discovery process is switched, so are its associated processes which include, for example, route maintenance.

This and other objects, features, and advantages in accordance with the present invention are provided by a method for managing and controlling the discovery and maintenance of routes in a mobile ad hoc network. The network includes a plurality of wireless mobile nodes and a plurality of wireless communication links connecting the nodes together. The method includes building and updating route tables at each node with a first one of proactive and reactive route discovery processes to define routes in the network. A route is a set of links and nodes from a source to a destination. The method also includes collecting and storing route stability information (statistics, heuristic rules, inferences, etc.) at each node, predicting route stability over time based upon the route stability information, and switching to a second one of the proactive and reactive route discovery processes when predicted route stability reaches a first transition parameter. Moreover, the method preferably includes switching back to the first one of the proactive and reactive route discovery processes when predicted route stability reaches a second transition parameter. The method manages and controls route maintenance processes even if they are identical for both the proactive and reactive cases.

The first and second transition parameters preferably comprise time-dependent thresholds, for example thresholds based upon a rate of change of source-destination subset pairs for at least one source node. The source-destination subset pairs comprise subsets of possible destination nodes for a designated source node. The time-dependent route stability information may be based upon node mobility, link failure, link creation, traffic congestion, any Quality of Service metric or any other parameter which is time dependent.

Furthermore, collecting and storing route stability information may include creating and updating a time-dependent route stability profile and/or a time-dependent route segment stability profile. A route segment is a set of links and nodes which define a reusable entity in each of a plurality of routes. Switching route discovery processes may also based upon the amount of nodes in the network, and may comprise multicasting a process-switch message to affected nodes of the network. Such affected nodes may be all the network nodes or a subset of the network nodes.

A system aspect of the invention is directed to a mobile ad hoc network having a plurality of wireless mobile nodes, and a plurality of wireless communication links connecting the nodes together. Each mobile node comprises a communications device to wirelessly communicate with other nodes of the plurality of nodes via the wireless communication links, and a controller to route communications via the communications device. The controller includes route tables defining routes in the network, wherein a route is defined by a set of links and nodes from a source to a destination. The controller also includes a route discovery module to discover routes and update the route tables with one of a plurality of route discovery processes, e.g. proactive and a reactive route discovery processes, a stability profile memory to store route stability information, a route stability predictor to predict route stability over time based upon the route stability information, a route discovery process selector to select between the proactive and reactive route discovery processes based upon the predicted route stability, a route maintenance process associated with the proactive route discovery process, and a route maintenance process associated with the reactive route discovery process. The route maintenance process for both the reactive and proactive route discovery processes may be identical.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

Figure 1:
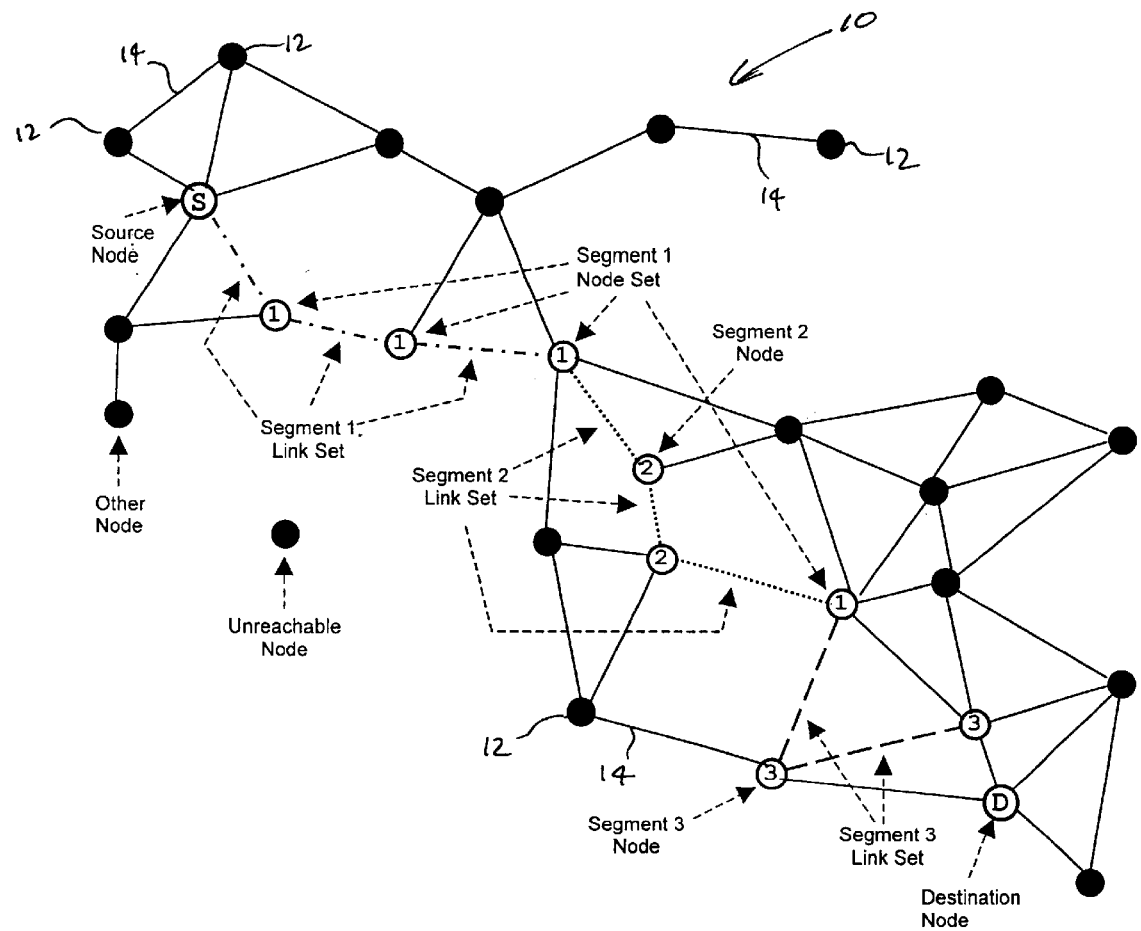
FIG. 1 is a schematic diagram of a mobile ad hoc network in accordance with the present invention.
Figure 2:
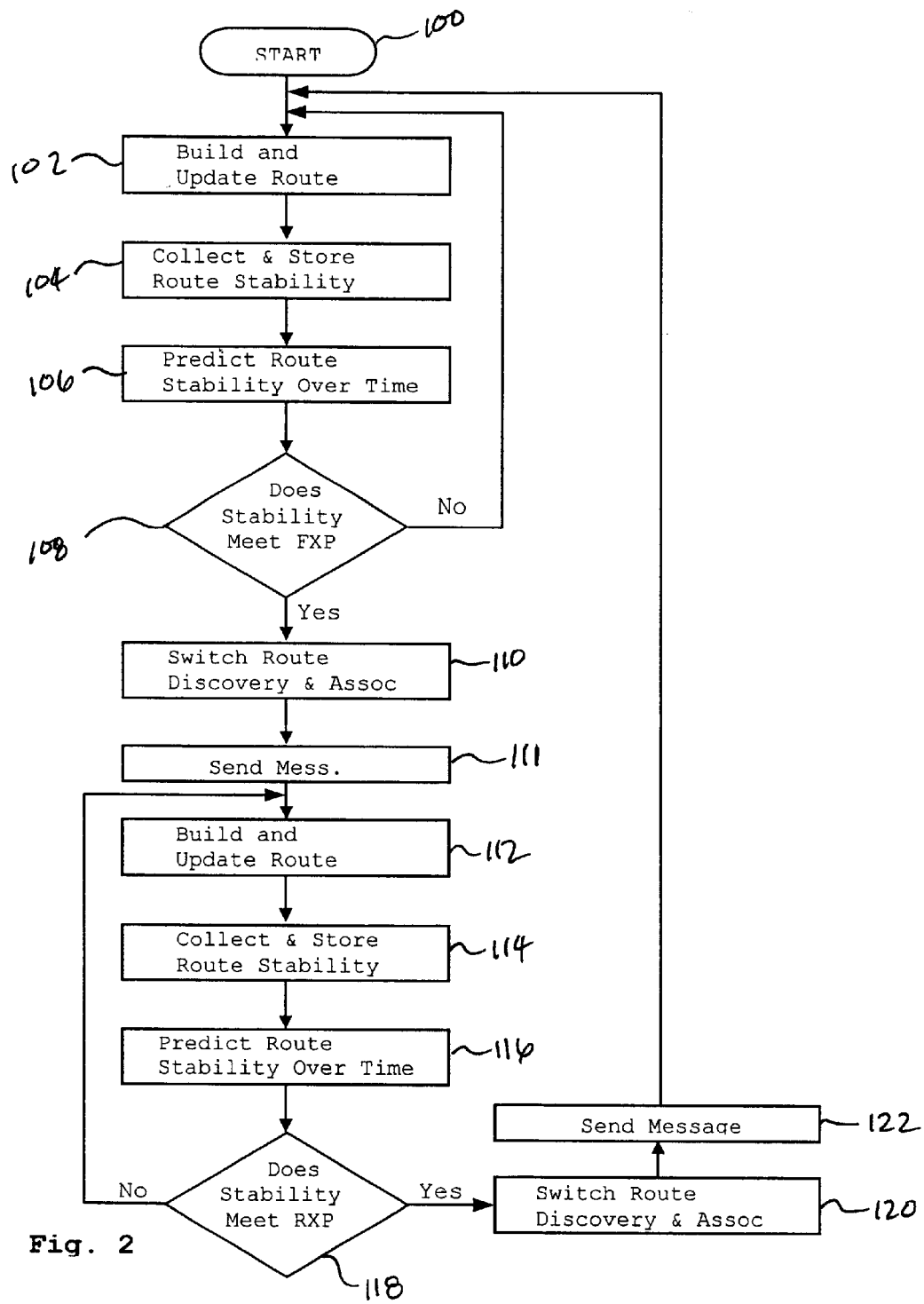
FIG. 2 is a flowchart illustrating the steps of a method for managing and controlling the discovery and maintenance of routes in accordance with the present invention.

Referring initially to FIGS. 1 and 2, a method for discovering routes from a source node to a destination node in a mobile ad hoc network 10 will now be described. The network 10 includes a plurality of mobile nodes 12 including the source node S and the destination node D with intermediate nodes therebetween. The nodes 12, such as laptop computers, personal digital assistants (PDAs) or mobile phones, are connected by wireless communication links 14 as would be appreciated by the skilled artisan. This framework class of protocols and processes is preferably referred to as the Temporal Transition Network Protocol (TTNP), for temporally combining, controlling and managing both proactive and reactive approaches (and/or other route discovery approaches) in any network architecture whether it is flat or structured such as in a hierarchical network.

TTNP will provide the protocol suite and transition parameters for supporting the switching back and forth between a plurality of route discovery approaches, e.g. any proactive and reactive network route discovery approaches, during the time-ordered evolution of the network 10. The protocol suite supports not only the transition parameters (quantities that signal TTNP to start the transition from a proactive to a reactive approach and vice versa) defined herein, but can also support other transition parameters defined by a system designer. TTNP will carry the negotiations between various subsets of nodes 12 and links 14 in the network 10 and interact with Quality of Service (QoS) and traffic management (which includes Admission Control, scheduling, buffer management and flow control), power management & control, security and any other network service components either internal or external to TTNP to gather the information needed to provide this support.

The method begins (FIG. 2; block 100) and includes building and updating route tables (block 102) at each node 12 with either a proactive or a reactive route discovery protocol/process to define routes in the network, i.e. build and maintain valid routes. A route is a set of links and nodes from a source to a destination. As discussed above, many routing protocols are reactive (on-demand) protocols as they collect routing information only when necessary and to destinations they need routes to, and do not maintain unused routes. This way the routing overhead is greatly reduced compared to proactive protocols which maintain routes to all destinations at all times. Ad Hoc on Demand Distance Vector (AODV), Dynamic Source Routing (DSR) and Temporally Ordered Routing Algorithm (TORA) are examples of reactive routing protocols. Examples of proactive routing protocols include Destination Sequenced Distance-Vector (DSDV) routing, Wireless Routing Protocol (WRP) and Optimal Link State Routing (OSLR).

The method also includes collecting and storing route stability information at each node (block 104), predicting/estimating route stability over time based upon the route stability information (block 106), and, at block 110, switching to a second one of the proactive and reactive route discovery and their associated processes when predicted route stability reaches a first transition parameter (block 108). Of course, building and updating route tables (block 112), collecting and storing route stability information at each node (block 114), and predicting/estimating route stability over time based upon the route stability information (block 116) would be then be performed under the switched-to route discovery and process. Moreover, the method preferably includes, at block 120, switching back to the first one of the proactive and reactive route discovery and their associated processes when predicted route stability reaches a second transition parameter (block 118).

The first and second transition parameters preferably specify time-dependent conditions which may include thresholds, for example thresholds based upon a rate of change of source-destination subset pairs for at least one source node, as is discussed in detail below. A Source Destination Subset (SDS) is the allowed subset of possible destination nodes for the designated source node. The limiting case is the entire network. A notable special case is a formal subnet. The route stability information may be based upon node mobility, link failure, link creation or other quantities or qualities that could affect the time-dependent stability of a route.

The Forward Transition Parameter (FXP) is the parameter that is used to specify when to switch (transition) from using the route discovery approach category (i.e., proactive or reactive) that the full network or a formally-designated subset of nodes was initialized with, to a different route discovery category. The Reverse Transition Parameter (RXP) is the parameter that is used to specify when to switch (transition) from using the current, but not initial, route discovery approach category that the full network or a formally-designated subset of nodes is using to that approach with which the network/subset of nodes was initialized.

Furthermore, collecting and storing route stability information (block 104) may include creating and updating a time-dependent route stability profile and/or a time-dependent route segment stability profile. A route segment (RS) is a set of links and nodes, with some commonality, grouped together to form a reusable entity in potentially more than one route. A route segment would include at least one link and one node. Nothing in the definition requires these links to be spatially contiguous or the nodes to be adjacent to (within 1 hop of) at least one other node in the RS. A spacially contiguous pair of links is defined as two links separated only by a single node connecting both links in a network diagram. In FIG. 1, Segment 1's links are contiguous, but Segment 1's nodes are not all within 1 hop of at least one other node in RS 1. A Segment Link Set (SLS) is an RS minus its nodes. A Segment Node Set (SNS) is an RS minus its links. Thus, a route is set of route segments RS whose union forms a contiguous path from the source to the destination. A Route Link Set (RLS) is a route minus its nodes, and a Route Node Set (RNS) is a route minus its links.

A TTNP Default Pool (TDP) contains the internal default objects for capabilities such as QoS, traffic management, link decay profiles, route maintenance, etc. that TTNP will use to accomplish its switching from proactive to reactive and vice versa in the event that such a capability is required by TTNP but not supplied by some other avenue such as via the application or route discovery technique.

Switching route discovery processes may also be based upon the amount of nodes 12 in the network 10, and may comprise multicasting a process-switch message to affected nodes of the network (blocks 111 and 122). Such affected nodes 12 may be all the network nodes or a subset of the network nodes.

Figure 3:
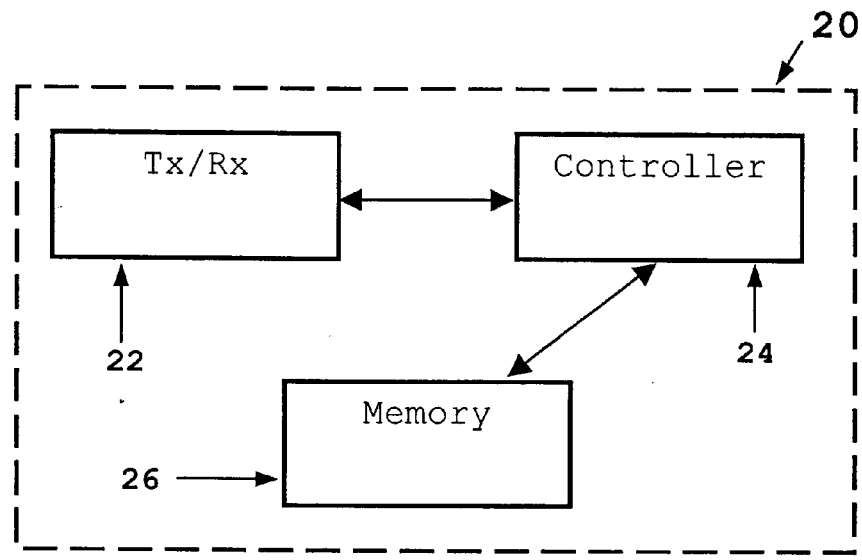
FIG. 3 is a schematic diagram illustrating a router of a node in accordance with the network of the present invention.
Figure 4:
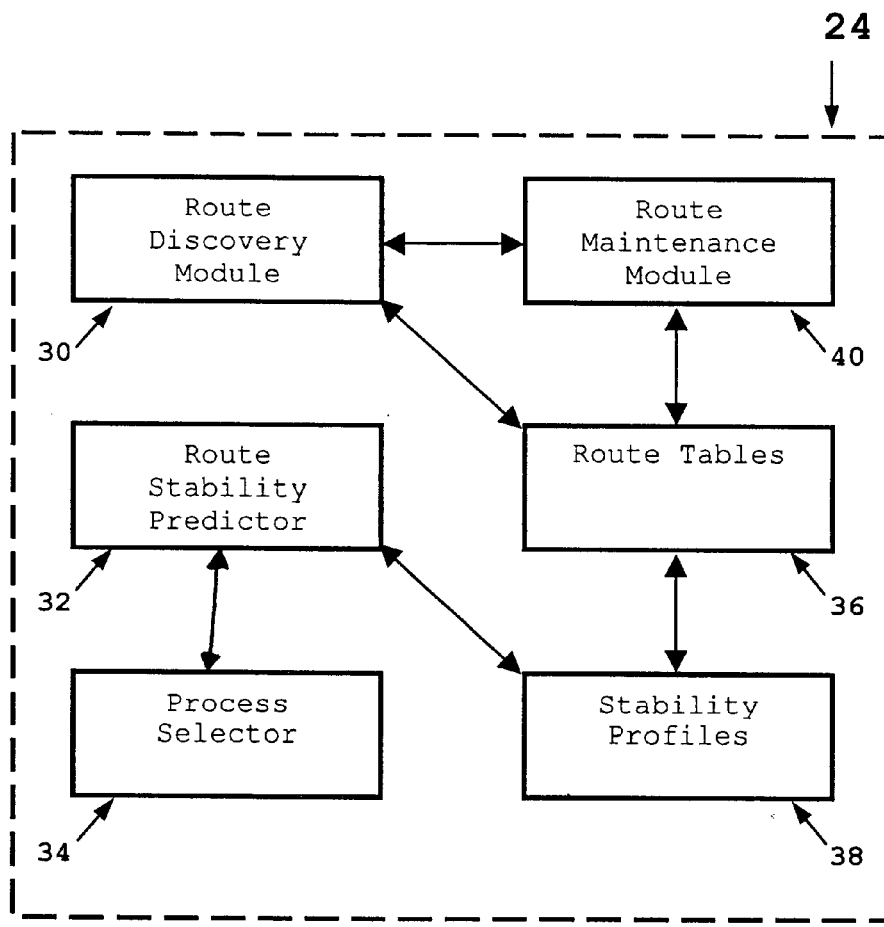
FIG. 4 is a schematic diagram illustrating the details of the controller of the router in FIG. 3.
Figure 1:
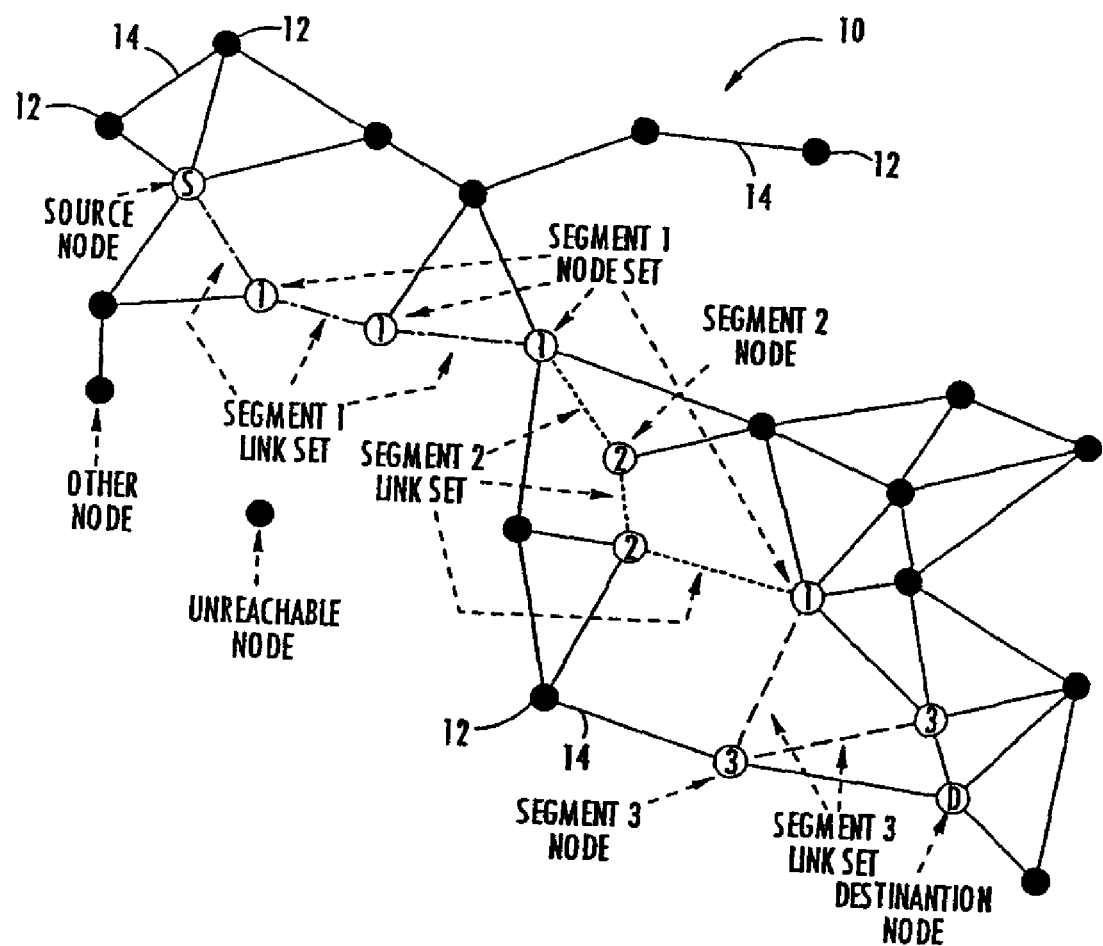
Figure 2:
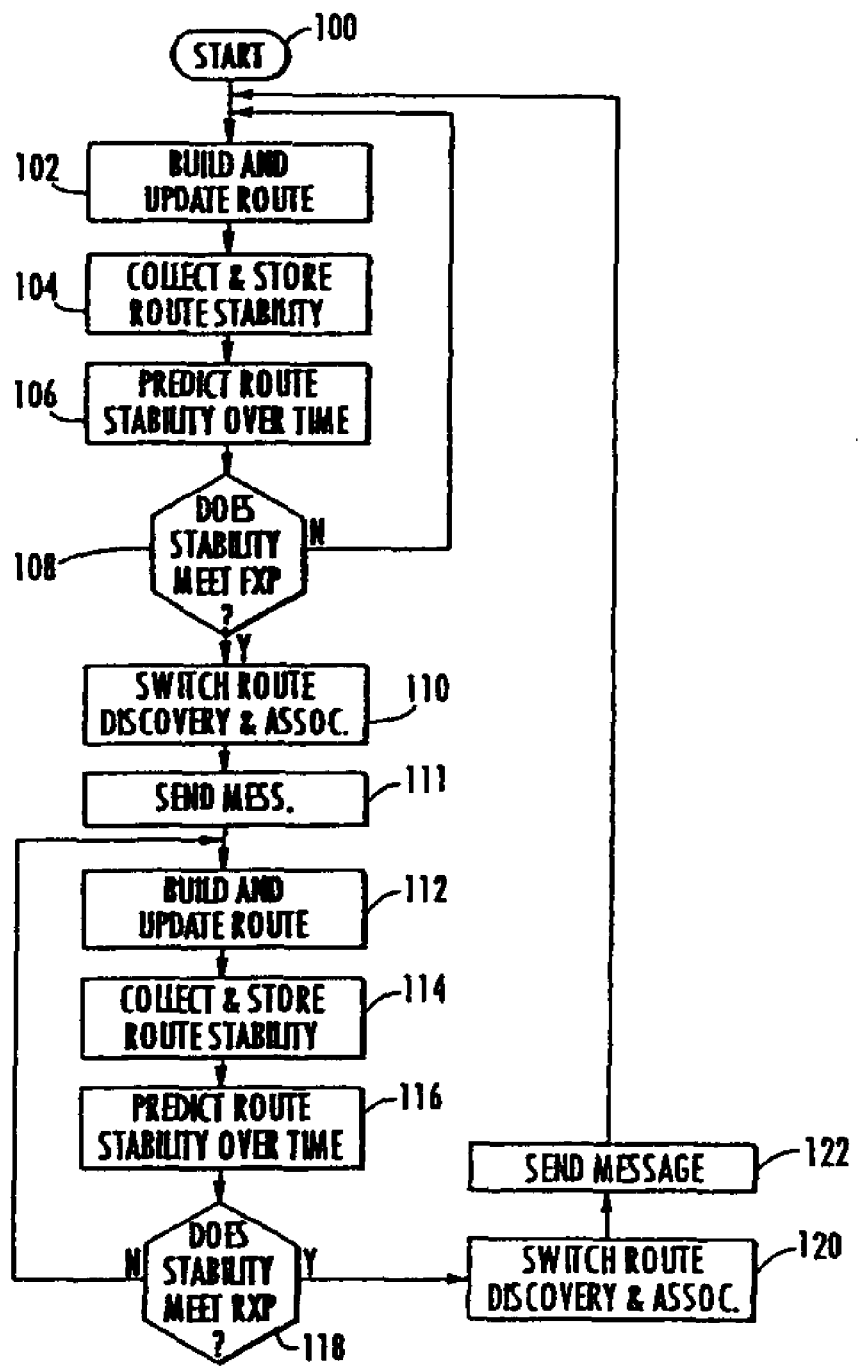
Figure 3:
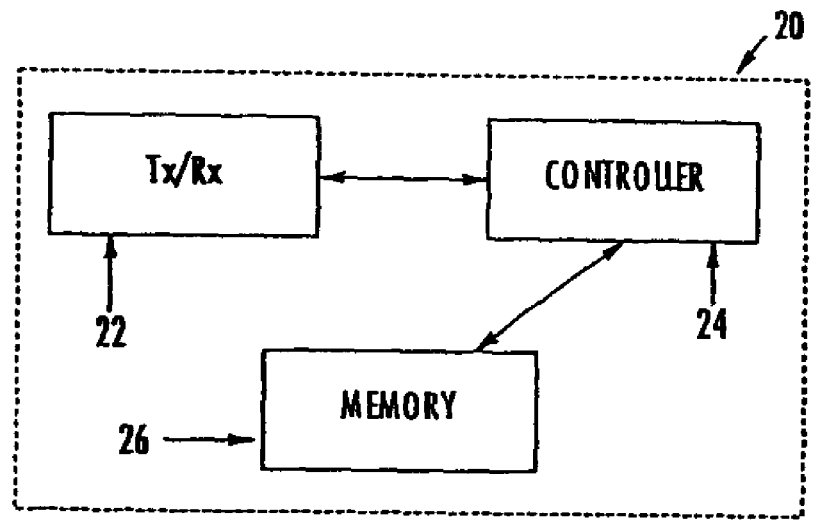
Figure 4:
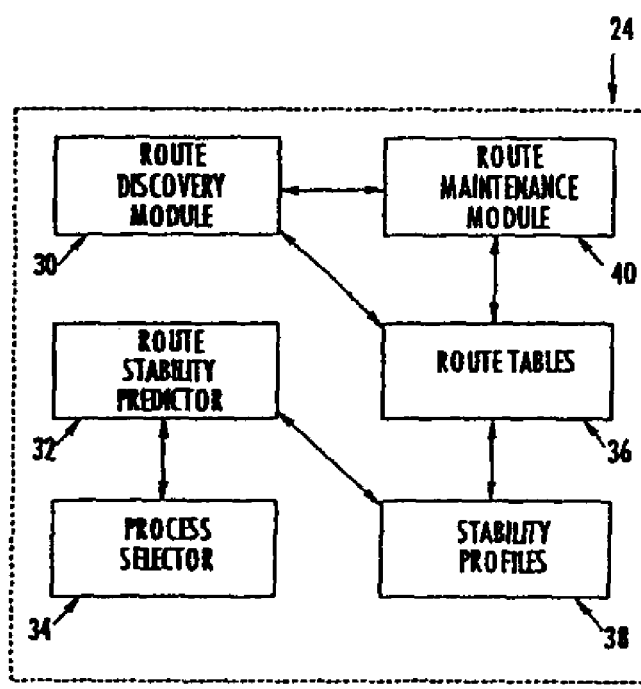

A system aspect of the invention will now be described with further reference to FIGS. 3 and 4. As discussed, the mobile ad hoc network 10 has a plurality of wireless mobile nodes 12, and a plurality of wireless communication links 14 connecting the nodes together. Each mobile node 12 includes a router 20 that has a communications device 22 to wirelessly communicate with other nodes of the plurality of nodes via the wireless communication links 14. Also, the router includes a controller 20 to route communications via the communications device 22. Also, a memory 26 may be included as part of the controller 24 or in connection with the controller.

The controller 24 includes route tables 36 to define routes in the network 10. Again, a route is a set of links 14 and nodes 12 from a source to a destination. The controller 24 also includes a route discovery module 30 to discover routes and update the route tables 36 with either a proactive or a reactive route discovery process. The controller also includes a route maintenance module 40 that is responsible for maintaining paths between active source-destination node pairs and for removing invalid routes from route tables 36. A stability profile memory 38 stores route stability information, a route stability predictor 32 predicts route stability over time based upon the route stability information, and a route discovery process selector 34 selects between the proactive and reactive route discovery processes based upon the predicted route stability. Again, it should be understood that blocks of the illustrations, and combinations of blocks in the illustrations, can be implemented by computer program instructions which may be provided to a processor to implement the functions specified in the block or blocks.

In sum, the network 10 would initially use either a proactive (e.g. OLSR, basic link state, TBRPF) or a reactive (e.g. DSR, AODV) protocol to discover and maintain routes between source S and destination D pairs in order to build the initial route table at that source node. It is possible that at the network's creation, route tables for some or all of the nodes 12 may be initialized by predefining a set of routes for each route table knowing that those routes may change over time. As time moves forward, the network topology will generally change through node mobility and link failures/creation. TTNP accounts for these dynamic topological changes in one or more transition parameters such that when some subset of these parameters reached a certain transition level, a switching (transition) would occur from using proactive route discovery to using reactive route discovery or vice versa. This transition could occur over the entire network or be confined to any portion of it as defined by TTNP profiles.

Note that whenever a route discovery approach transition occurs, TTNP preferably automatically transitions other functionality associated with the route discovery approach such as route maintenance. One unique capability of TTNP is that it mitigates the selection of redundant or similar supporting functionality such as route maintenance or QoS in the event of conflicts between using what is supplied by the route discovery approach (proactive or reactive) and what is supplied by some other "plug-in" from, for example, a third party or from the TTNP default pool.

TTNP will properly operate in either of its two most fundamental cases. First, the initial network state begins using a proactive route discovery process and then upon reaching the threshold value of an applicable forward transition parameter (FXP), the network 10 transitions to using its companion on-demand/reactive route discovery process. Transition from this state of using an on-demand route discovery process back to using a proactive route discovery process occurs when a relevant reverse transition parameter (RXP) threshold has been reached. This RXP may or may not be the same parameter as the FXP, but even if it is, the value assigned to the RXP may not be the same as the FXP value. The key principal to remember for both FXP and RXP is that these parameters are either time itself or some other parameters which have some type of time-dependent relationship defined for describing the dynamics (actual, estimated or predicted) of these parameters.

An example of the basic, unique functioning of TTNP is when the number of source-destination subset pairs for a given source node increases at a rate specified by RXP, then the transition from on-demand routing to proactive routing would only be triggered for network interaction with that subset of nodes. If the particular RXP is defined as a network-wide parameter, then the switch in routing algorithms would occur globally within the network 10. If that RXP is defined only for a subset of the full network 10, then the only nodes affected by the change from reactive to proactive would be those in that subset. Another unique capability of TTNP is to be able to propagate this switching to other SDSs (as specified in a TTNP profile) based on TTNP monitoring the RXP and FXP of only a few representative SDSs (maybe even just one SDS). This in effect will be a powerful and efficient mechanism for more rapidly making such decisions on a broader network-wide basis. The usefulness and correctness of using this "sampling" approach rests in the validity of the selected SDS to represent the state of other SDSs.

Note that TTNP does not require any specific approach within a category (proactive or reactive) to use. For example, the application or systems designer may decide what proactive and what reactive techniques to use. TTNP does not make those decisions, but it does determine when to use the application-specified proactive and when to use the application-specified reactive approach. Neither does TTNP decide where to use proactive or where to use reactive approaches to initialize a network or a formal subset of the nodes. That again is in the hands of the applications or systems designer.

When a route segment RS is created, a route segment profile also gets created which contains the following information: a Segment Identification (SID) which is the name, number, or other designator that is used to identify this particular route segment; a Segment Link Set Profile (SLSP) which is the ordered SLS for this segment, which ordering may change over time as well as the ordering parameter(s); a Segment Node Set Profile (SNSP) which is the ordered SNS for this segment, which ordering may change over time as well as the ordering parameter(s); A Time Dependent Segment Stability Profile (TSSP) which can be any type of descriptor such as a mathematical function (deterministic, statistical, fuzzy, chaotic, etc.), set of heuristic rules, etc. combined with accumulated node and link status/state information that together predict the way in which a route segment changes over time.

For example, one of the simplest descriptors is a linear function characterized by the link quality and node dynamics for that route segment. Each link and node associated with this descriptor would have the same stability profile function, but with different slopes which represent different rates of deterioration and restoration. Link and node availability data would be collected at various times for the links and nodes in this segment and processed by the descriptor. This is a very effective mechanism for representing RSs with any type of stability from highly unstable to essentially permanently stable segments. Many other examples of a TSSP descriptor could be formulated as is optimal for a given application or class of applications.

When a route is created, a route profile also gets created which contains the following information: A Route Identification (RID) which is the name, number, or other designator that is used to identify this particular route; a Route Segment Set Profile (RSSP) which contains the ordered set of route segments (RS) that make up the set of links in this route segment, which ordering may change over time as well as the ordering parameter(s); a Time Dependent Route Stability Profile (TRSP) which can be any type of descriptor such as a mathematical function (deterministic, statistical, fuzzy), set of heuristic rules, etc. that predict the way in which a route changes over time with respect to which route segments connect/disconnect to this route.

For example, one of the simplest descriptors is a linear function characterized by the link quality and node dynamics for that route's segment. Each route segment associated with this descriptor would have the same stability profile function, but with different slopes which represent different rates of deterioration and restoration. Segment availability data and intersegment interaction data would be collected at various times for the segments in this route and processed by the descriptor. Many other examples of a TRSP descriptor could be formulated as is optimal for a given application or class of applications. The TRSP is a very effective mechanism for representing the stability of a route with respect to entire route segments. The TRSP indicates a higher level view of stability in the TTNP network than what the examination of individual links and nodes would show.

When an SDS is created, a SDS profile (SDSP) also gets created which contains the following information describing the properties of this SDS: a SDS Identification (SDID) which is the name, number, or other designator that is used to identify this particular SDS; A SDS Route Table (SRT) which is the route ids that make up the routes for this SDS; Current Route Discovery Object (CRDO) which is the route discovery approach in current use by this SDS; and Alternate Route Discovery Object Pool (ARDOP) which is the group (pool) of available route discovery methods/approaches available for this SDS. Currently, only proactive and reactive methods/approaches exist. TTNP's framework permits fundamentally new classes of routing beyond proactive or reactive to be incorporated into a TTNP framework without any loss of generally in the applicability or capability of TTNP.

An example of the general execution flow of TTNP starting with a proactive initialization sequence will now be described. Create and initialize the SDS profiles. Proactively build the initial route table from source node S, to each of the other nodes in S's SDS. Note: TTNP differs substantially from ZRP's zone concept in this regard because ZRP defines a zone as some number of contiguous hops from the given source node. TTNP does not restrict the metric to number of hops, TTNP does not require contiguous hops, nor does TTNP even depend on a special metric to specify which routes within a SDS must be discovered and maintained by a proactive approach and which routes within a SDS must be reactively discovered and maintained by a reactive approach. Zone Routing Protocol (ZRP) is disclosed in U.S. Pat. No. 6,304,556 to Haas. ZRP is a hybrid protocol using both proactive and reactive approaches based upon some number of contiguous wireless hops distance from a source node.

In this example, the route table is proactively updated at the designated times until enough route information can be collected to predict which routes are likely to be stable and which ones are not likely to be stable. The collected data is recorded in the associated TRSPs and TSSPs. Create and update the information bases of the associated TRSPs and TSSPs to track the stability of each of the network components (nodes, links, segments, and routes). Not all the collected data in these information bases need come from just a route table analysis. This and other related data can also be collected from separate QoS and traffic management information bases if those services have collected such data. This data can also come directly from nodes transmitting link and node status.

At some point in time, when the route table from S to all its possible destinations is sufficiently stable, then instead of continuing to update each link in the SDS on a proactive basis, assume enough of the routes in the relevant portion of the network will continue to be stable over some number of time periods such that switching to a reactive approach will be used to discover a new stable route in the event that a route cannot be found in the S route table. (At this point, the normal procedure for a reactive route discovery approach such as DSR comes into play.) The FXP is the parameter that specifies what sufficiently stable means in order to notify TTNP to switch from proactive to reactive route discovery. Note that other conditions such as high traffic characteristics may also affect FXP by delaying the transition from proactive to reactive routing.

After some period in time, preconfigured at network creation or adaptively learned through on-time route stability profile analysis, too many routes or too many existing complex routes could have become unstable or just simply unusable because of other poor QoS conditions. On top of this, if there is now the need to have many source-destination pairs for S, the switch from reactive to proactive routing will need to occur. The RXP is the parameter that effectively specifies when it is time to perform this switching. The execution flow of TTNP starting with a SDS initialized with a reactive route discovery approach is similar to the above steps for a SDS being initialized to a proactive route discovery approach.

Whether to switch from reactive to proactive or vice versa when a network becomes too unstable should generally depend on more than just some simple stability measurement. It may also depend on the number of nodes in the network that become unstable. In other words, scalability is often very important in a switching decision. For instance, when there is a lot of nonoverhead network traffic to several nodes from the source node and the routes to these same nodes are in constant flux, then whether to switch or may require additional rules to make that determination. In this case, RXP and FXP must be intelligently set by these rules.

The TTNP protocol format includes a header followed by an associated message. Messages may include operations and data. The following is a partial listing of TTNP operations. Switch from reactive to proactive mode (SWIREPR); Switch from proactive to reactive mode (SWIPRRE); Request SLSP (REQSLSP); Request SNSP (REQSNSP); Request TSSP (REQTSSP)—Specific information from a TSSP may be requested in an "additional information" field; Request RSSP (REQRSSP); Request TRSP (REQTRSP)—Specific information from a TRSP may be requested in an "additional information" field; Request TDP (REQTDP); Create SLSP (CRESLSP); Create SNSP (CRESNSP); Create TSSP (CRETSSP); Create RSSP (CRERSSP); Create TRSP (CRETRSP); Create SDS (CRESDS); Create SDSP (CRESDSP); Create TDP (CRETDP); Delete SLSP (DELSLSP); Delete SNSP (DELSNSP); Delete TSSP (DELTSSP); Delete RSSP (DELRSSP); Delete TRSP (DELTRSP); Delete SDSP (DELSDSP); Delete TDP (DELTDP); Modify SLSP (MODSLSP)—could include adding or deleting multiple links between two nodes; Modify SNSP (MODSNSP); Modify TSSP (MODTSSP); Modify RSSP (MODRSSP); Modify TRSP (MODTRSP); Modify SDSP (MODSDSP); Modify TDP (MODTDP); Request SDS of a given source node (REQSDSS); Add nodes to a SDS (ADDNSDS); Delete nodes from a SDS (DELNSDS); Request RXP information (REQRXPI); Request FXP information (REQFXPI); Set RXP information (SETRXPI); Set FXP information (SETFXPI); Create RXP information (CRERXPI); Create FXP information (CREFXPI); Modify RXP information (MODRXPI); Modify FXP information (MODFXPI); Delete RXP information (DELRXPI); Delete FXP information (DELFXPI); Set TDP information (SETTDPI); Modify TDP information (MODTDPI); Delete TDP information (DELTDPI).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for managing and controlling the discovery and maintenance of routes in a mobile ad hoc network comprising a plurality of wireless mobile nodes and a plurality of wireless communication links connecting the nodes together, the method comprising:

building and updating route tables at each node with a first one of proactive and reactive route discovery processes to define routes in the network, a route comprising a set of links and nodes from a source to a destination;

collecting and storing route stability information at each node;

predicting route stability over time based upon the route stability information; and switching to a second one of the proactive and reactive route discovery processes when predicted route stability reaches a first transition parameter.

2. A method according to claim 1 further comprising switching back to the first one of the proactive and reactive route discovery processes when predicted route stability reaches a second transition parameter.

3. A method according to claim 2 wherein the first and second transition parameters specify time-dependent conditions.

4. A method according to claim 3 wherein the time-dependent conditions are based upon a rate of change of source-destination subset pairs for at least one source node, the source-destination subset pairs comprising subsets of possible destination nodes for the at least one source node.

5. A method according to claim 1 wherein the route stability information is based upon node mobility, link failure, link creation, node stability and link quality.

6. A method according to claim 1 wherein collecting and storing route stability information comprises creating and updating a time-dependent route stability profile.

7. A method according to claim 1 wherein collecting and storing route stability information comprises creating and updating a time-dependent route segment stability profile, a segment comprising a set of links and nodes which define a reusable entity in one of more routes.

8. A method according to claim 1 wherein switching route discovery processes is also based upon an amount of nodes in the network.

9. A method according to claim 1 wherein switching route discovery processes comprises multicasting a process-switch message to affected nodes of the network.

10. A method according to claim 9 wherein the affected nodes comprise all the nodes.

11. A method according to claim 9 wherein the affected nodes comprise a subset of the nodes.

12. A method for managing and controlling the discovery and maintenance of routes in a mobile ad hoc network comprising a plurality of wireless mobile nodes and a plurality of wireless communication links connecting the nodes together, the method comprising:
  building and updating route tables at each node with a first route discovery process to define routes in the network, a route comprising a set of links and nodes from a source to a destination;
  collecting and storing route stability information at each node;
  predicting route stability over time based upon the route stability information; and
  switching to a second route discovery process when predicted route stability reaches a first transition parameter, the second route discovery process being different from the first route discovery process.

13. A method according to claim 12 further comprising switching back to the first route discovery process when predicted route stability reaches a second transition parameter.

14. A method according to claim 13 wherein the first and second transition parameters specify time-dependent conditions.

15. A method according to claim 12 wherein the route stability information is based upon node mobility, link failure, link creation, node stability and link quality.

16. A method for managing and controlling the discovery and maintenance of routes in a mobile ad hoc network comprising a plurality of wireless mobile nodes and a plurality of wireless communication links connecting the nodes together, the method comprising:
  at each node, building and updating route tables with a proactive route discovery process to define routes to other nodes in the network, a route comprising a set of links and nodes;
  at each node, collecting and storing route stability information;
  at each node, predicting route stability over time based upon the route stability information; and
  at each node, switching to a reactive route discovery process when predicted route stability reaches a first transition parameter.

17. A method according to claim 16 further comprising, at each node, switching back to the proactive route discovery process when predicted route stability reaches a second transition parameter.

18. A method according to claim 17 wherein the first and second transition parameters comprise time-dependent conditions.

19. A method according to claim 16 wherein the route stability information is based upon node mobility, link failure, link creation, node stability and link quality.

20. A method according to claim 16 wherein collecting and storing route stability information comprises creating and updating a time-dependent route stability profile.

21. A method according to claim 16 wherein collecting and storing route stability information comprises creating and updating a time-dependent route segment stability profile, a segment comprising a set of links and nodes which define a reusable entity in each of a plurality of routes.

22. A method for managing and controlling the discovery and maintenance of routes in a mobile ad hoc network comprising a plurality of wireless mobile nodes and a plurality of wireless communication links connecting the nodes together, the method comprising:
  at each nod, building and updating route tables with a reactive route discovery process to define routes to other nodes in the network, a route comprising a set of links and nodes;
  at each node, collecting and storing route stability information;
  at each node, predicting route stability over time based upon the route stability information; and
  at each node, switching to a proactive route discovery process when predicted route stability reaches a first transition parameter.

23. A method according to claim 22 further comprising, at each node, switching back to the reactive route discovery process when predicted route stability reaches a second transition parameter.

24. A method according to claim 23 wherein the first and second transition parameters specify time-dependent conditions.

25. A method according to claim 22 wherein the route stability information is based upon node mobility, link failure, link creation, node stability and link quality.

26. A method according to claim 22 wherein collecting and storing route stability information comprises creating and updating a time-dependent route stability profile.

27. A method according to claim 22 wherein collecting and storing route stability information comprises creating and updating a time-dependent route segment stability profile, a segment comprising a set of links and nodes which define a reusable entity in each of a plurality of routes.

28. A mobile ad hoc network comprising:
  a plurality of wireless mobile nodes;
  a plurality of wireless communication links connecting the nodes together;

each mobile node comprising
- a communications device to wirelessly communicate with other nodes of the plurality of nodes via the wireless communication links, and
- a controller to route communications via the communications device, and comprising
  - route tables defining routes in the network, a route comprising a set of links and nodes from a source to a destination,
  - a route discovery module to discover routes and update the route tables with one of a plurality of route discovery processes,
  - a route stability profile memory to store route and route segment stability information,
  - a route stability predictor to predict route stability over time based upon the route and route segment stability information, and
  - a route discovery process selector to select between the plurality of route discovery processes based upon the predicted route stability.

29. A network according to claim 28 wherein the plurality of route discovery processes include proactive and reactive route discovery processes; and wherein the route discovery process selector selects the proactive route discovery process when the predicted route stability reaches a first transition parameter, and selects the reactive route discovery process when predicted route stability reaches a second transition parameter.

30. A network according to claim 29 wherein the first and second transition parameters comprise time-dependent conditions.

31. A network according to claim 28 wherein the plurality of route discovery processes include proactive and reactive route discovery processes; and wherein the route discovery process selector selects the reactive route discovery process when the predicted route stability reaches a first transition parameter, and selects the proactive route discovery process when predicted route stability reaches a second transition parameter.

32. A network according to claim 31 wherein the first and second transition parameters comprise time-dependent conditions.

33. A network according to claim 28 wherein the route stability information is based upon node mobility, link failure, link creation, node stability, and link quality.

34. A network according to claim 28 wherein the stability profile memory comprises a time-dependent route stability profile.

35. A network according to claim 28 wherein the stability profile memory comprises a time-dependent route segment stability profile, a route segment comprising a set of links and nodes which define a reusable entity in each of a plurality of routes.

36. A network according to claim 28 wherein the route discovery process selector multicasts a process-switch message to affected nodes of the network.

37. A network according to claim 36 wherein the affected nodes comprise all the nodes.

38. A network according to claim 36 wherein the affected nodes comprise a subset of the nodes.

* * * * *

UNITED STATES PATENT AND TRADEMARK OFFICE
CERTIFICATE OF CORRECTION

PATENT NO. : 6,754,192 B2
DATED : June 22, 2004
INVENTOR(S) : Kennedy

It is certified that error appears in the above-identified patent and that said Letters Patent is hereby corrected as shown below:

Delete drawing on Title page and replace with the following:

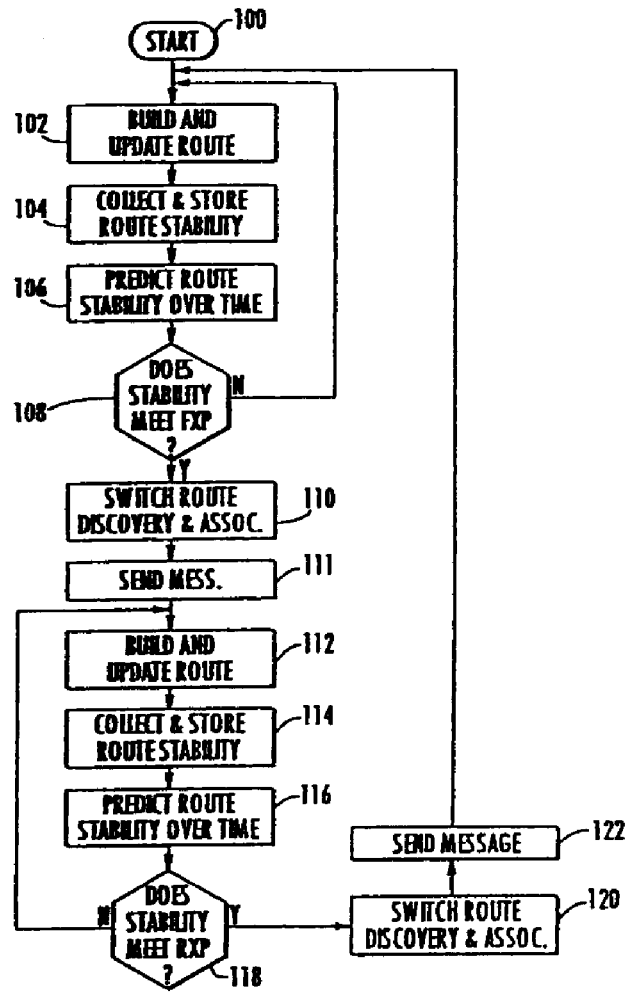

FIG. 2.

UNITED STATES PATENT AND TRADEMARK OFFICE
CERTIFICATE OF CORRECTION

PATENT NO. : 6,754,192 B2
DATED : June 22, 2004
INVENTOR(S) : Kennedy

It is certified that error appears in the above-identified patent and that said Letters Patent is hereby corrected as shown below:

Drawings,
Delete FIG. 1 and insert new FIG. 1 as attached.
Delete FIG. 2 and insert new FIG. 2 as attached.
Delete FIG. 3 and insert new FIG. 3 as attached.
Delete FIG. 4 and insert new FIG. 4 as attached.

Column 1,
Line 17, delete "type" insert -- types --.

Column 5,
Line 44, delete "subnet" insert -- subset --.

Column 6,
Line 3, delete "spacially" insert -- spatially --.
Line 36, delete "controller 20" insert -- controller 24 --.

Column 12,
Line 34, delete "nod" insert -- node --.

Signed and Sealed this

First Day of November, 2005

JON W. DUDAS
*Director of the United States Patent and Trademark Office*